(12) United States Patent
Sun et al.

(10) Patent No.: US 12,539,272 B2
(45) Date of Patent: Feb. 3, 2026

(54) MICROEMULSION-BASED VACCINE DELIVERY SYSTEM, PREPARATION METHOD THEREFOR AND USE THEREOF

(71) Applicant: Sichuan University, Sichuan (CN)

(72) Inventors: Xun Sun, Sichuan (CN); Zhengjun Chen, Sichuan (CN); Tao Gong, Sichuan (CN); Zhirong Zhang, Sichuan (CN)

(73) Assignee: Sichuan University, Sichuan (CN)

( * ) Notice: Subject to any disclaimer, the term of this patent is extended or adjusted under 35 U.S.C. 154(b) by 575 days.

(21) Appl. No.: 17/909,199

(22) PCT Filed: Apr. 12, 2021

(86) PCT No.: PCT/CN2021/086642
§ 371 (c)(1),
(2) Date: Sep. 2, 2022

(87) PCT Pub. No.: WO2021/208860
PCT Pub. Date: Oct. 21, 2021

(65) Prior Publication Data
US 2023/0086736 A1    Mar. 23, 2023

(30) Foreign Application Priority Data
Apr. 13, 2020 (CN) .......................... 202010283350.9

(51) Int. Cl.
*A61K 9/107* (2006.01)
*A61K 39/00* (2006.01)
*A61K 39/39* (2006.01)

(52) U.S. Cl.
CPC ............ *A61K 9/1075* (2013.01); *A61K 39/00* (2013.01); *A61K 39/001186* (2018.08); *A61K 39/001192* (2018.08); *A61K 39/39* (2013.01); *A61K 2039/55561* (2013.01)

(58) Field of Classification Search
CPC .......... A61K 9/1075; A61K 39/001192; A61K 39/001186; A61K 39/00; A61K 39/39; A61K 2039/55561
See application file for complete search history.

(56) References Cited

U.S. PATENT DOCUMENTS

2016/0175432 A1* 6/2016 Ma ........................ A61K 39/12
424/278.1

FOREIGN PATENT DOCUMENTS

| CN | 1184431 A | 6/1998 | | |
|---|---|---|---|---|
| CN | 1338947 A | 3/2002 | | |
| CN | 101903041 A | 12/2010 | | |
| CN | 104013955 A | 9/2014 | | |
| CN | 104147599 A | * 11/2014 | | |
| CN | 108187040 A | 6/2018 | | |
| CN | 111658611 A | 9/2020 | | |
| JP | 2002537102 A | 11/2002 | | |
| JP | 2013504583 A | 2/2013 | | |
| JP | 2017522287 A | 8/2017 | | |
| JP | 2019521960 A | 8/2019 | | |
| KR | 20140026392 A | 3/2014 | | |
| WO | WO-2011031850 A1 * | 3/2011 | .............. | A61P 31/00 |
| WO | 2019241873 A1 | 12/2019 | | |

OTHER PUBLICATIONS

Machine translation CN-104147599-A (Year: 2014).*
Google Search; Hepatitis B surface antigen structure (accessed Mar. 2025) (Year: 2025).*
Li et al.; Study on the preparation and physicochemical properties of submicron emulsion vaccine adjuvant; West China Journal of Pharmaceutical Sciences, V 33, N 02, 2018, 139-142 (Year: 2018).*
Google Search; emulsifier / surfactant (accessed Mar. 2025) (Year: 2025).*
Google Search; mineral oil (accessed Mar. 2025) (Year: 2025).*
Japanese Patent Application No. 2022-557987, first office action.
You Li and Xun Sun. "Study on the preparation and physicochemical properties of submicron emulsion vaccine adjuvant." West China Journal of Pharmaceutical Sciences 33(2) (2018): 139-142. DOI: 10.13375/j.cnki.wcjps.2018.02.008.
CN 202010283350.9 first office action and search report.
PCT/CN2021/086642 international search report.
Brito, Luis A., and Derek T. O''Hagan. "Designing and building the next generation of improved vaccine adjuvants." Journal of Controlled Release 190 (2014): 563-579.
Chen, Zhengjun, et al. "Smart combination of aluminum hydroxide and MF59 to induce strong cellular immune responses." Journal of Controlled Release 349 (2022): 699-711.
EP21788336.2 European extended search report.
KR10-2022-7031274 Request for the Submission of an opinion dated Jun. 17, 2025.

* cited by examiner

*Primary Examiner* — Robert A Wax
*Assistant Examiner* — John W Lippert, III
(74) *Attorney, Agent, or Firm* — IPro, PLLC (57) ABSTRACT

The present disclosure provides a microemulsion-based vaccine delivery system, and further provides a preparation method and an application thereof. Using the microemulsion absorbing a series of metal ion compounds, and adding an antigen in a preparation process, antigen entrapment can be realized and a stable vaccine preparation is obtained. The prepared vaccine can effectively be taken up by an antigen-presenting cell and effectively delivered to lymph nodes to induce an antigen-specific immune response, and the same has a wide application prospect.

13 Claims, 4 Drawing Sheets

MICROEMULSION-BASED VACCINE DELIVERY SYSTEM, PREPARATION METHOD THEREFOR AND USE THEREOF

CROSS-REFERENCE TO RELEVANT APPLICATIONS

The disclosure claims priority to the Chinese patent application filed on Apr. 13, 2020 to the CNIPA, China National Intellectual Property Administration with the application number of No. 202010283350.9 and the title of "MICROEMULSION-BASED VACCINE DELIVERY SYSTEM, PREPARATION METHOD THEREFOR AND USE THEREOF", the entire contents of which are incorporated herein by reference.

TECHNICAL FIELD

The disclosure relates to a microemulsion-based vaccine delivery system, and a preparation method thereof, and relates to the technical field of medicines.

BACKGROUND

Vaccination is one of the greatest inventions of modern medicine, and is also an effective means for the prevention and eradication of many diseases, which is used for controlling various infectious diseases. Three important directions of vaccine development include: the discovery of neoantigen, new adjuvant technologies and new carrier platforms.

Traditional live attenuated and inactivated vaccines may essentially contain natural adjuvant components, which may include granular proteins, lipids and oligonucleotides. However, due to some intrinsic limitations of these attenuated and inactivated vaccines, such as mutation of attenuated pathogenic microorganisms into highly pathogenic microorganisms, and incomplete inactivation of the inactivated vaccines in preparation, when these vaccines act on a body, a disease in the body may be directly caused. Subunit vaccines refer to vaccines prepared by extracting fragments with immune activity from the pathogenic microorganisms by means of chemical decomposition, recombinant expression, etc. Compared with the inactivated vaccines and the live attenuated vaccines, the subunit vaccines have the advantages of higher safety and stability, capability of large-scale production, etc., and become the main trend for the development and application of modern vaccines. However, the subunit vaccines also have the shortcomings of low immunogenicity, short protective action time, slow onset of taking effect, etc. Adjuvants are widely used in subunit vaccines in order to overcome these shortcomings. The use of a vaccine delivery carrier can enhance an immune response level and improve the stability of vaccine preparation. In the past ten years, nanoscale (<1000 nm) materials, such as liposome, ISCOMS, polymeric and degradable nanospheres and nanoparticles attract people's attention as delivery carriers of vaccine antigen. Such carriers not only can stabilize the vaccine antigen to avoid antigen degradation, but also have a certain adjuvant effect, and can improve the immune response level of the antigen in the body.

Emulsions have a long history as adjuvants in human and animal vaccines. A Freund's adjuvant is successfully developed by Freund, a Hungarian-American bacteriologist, in 1935, and he firstly proved that mineral oil (paraffin) combined with mycobacteria had an adjuvant effect. Such adjuvant is called "Freund's complete adjuvant". Bacteria-free water-in-oil (w/o) emulsions (Freund's incomplete adjuvant) are thereafter applied to veterinary vaccines. Although such emulsions as Freund's incomplete adjuvants have also been applied to human beings, including influenza vaccines, they easily cause adverse reactions. Water-in-oil emulsions MF59 is prepared by replacing the mineral oil with degradable oil phase squalene; and MF59 adjuvanted influenza vaccines have been approved by European Union in 1997, and so far, the vaccines have been approved by more than 30 countries. Emulsion adjuvants that have been clinically approved by the United States and Europe for use also include AS03 and AF03.

Metal ion compound adjuvants are widely applied, wherein aluminum salts, calcium salts, zinc salts, iron salts and zirconium salts are often used as antigen adsorbents. Aluminum salt adjuvants are widely applied in vaccines, including aluminum potassium sulfate, aluminum phosphate, and aluminum hydroxide, etc. Such adjuvants keep the antigen retained and make it slowly release, and can cause local inflammatory reactions to attract activated lymphocytes, and improve an immune response as well as a complement system; the aluminum adjuvant mainly causes a humoral immune response instead of a cellular immune response; a calcium phosphate adjuvant has been successfully applied in France for preparation of diphtheria-pertussis-tetanus (DPT) vaccines, poliomyelitis vaccines, *Bacillus* Calmette Guerin (BCG) vaccines, measles vaccines, yellow fever vaccines, hepatitis B vaccines, HIV glycoprotein vaccines, and other vaccines, and the effect of the adjuvants thereof may be similar to that of the aluminum adjuvant, while calcium is a natural structural component of a human body, and is highly tolerated in the body; a ferric hydroxide adjuvant can improve humoral and cellular immune responses of the body simultaneously, and therefore it will take a place in application of immune adjuvants of vaccines in the future; and a zinc hydroxide colloid used alone or in combination with ATP can improve an immune response to a rabies virus antigen to a certain extent, and the toxic and side effects of a zinc element is extremely low, so that there is a great potential for development and application of the zinc hydroxide colloid.

In this application, a metal ion compound is adsorbed onto a microemulsion surface, so that the specific surface area thereof is increased dramatically; the microemulsion has the characteristics of high surface reactivity, multiple active centers, and high adsorption capacity, etc. The microemulsion can absorb more antigen under the condition of the same metal ion compound content, which can be prepared into nanoscale particles for vaccine delivery.

SUMMARY

One of the purposes of the disclosure is to provide a vaccine delivery system consisting of a metal ion compound, an antigen and a microemulsion, wherein the metal ion compound is absorbed by the microemulsion. The disclosure prepares the microemulsion by such methods as high-pressure homogenization, ultrasound and high-speed stirring, the metal ion compound is adsorbed onto the microemulsion surface, and different antigen components are added to prepare a vaccine. The vaccine prepared in the disclosure is capable of delivering the antigen to a lymph node for efficient uptake by antigen-presenting cells and the induction of an antigen-specific immune response.

In the disclosure, at a pH of 4.0 to 10.0, the oil phase in emulsions and emulsifier contain carboxyl, phosphoryl, sulfonyl, sulphate group, sulfite group, phenolic hydroxyl, enol group and the like, which can be partially or totally ionized to generate anions; metal cations are adsorbed onto the microemulsion surface by reaction with the anions on the microemulsion surface, and the metal cations can further absorb the anion portion of the metal ion compound to prepare the microemulsion absorbing the metal ion compound. Accordingly, the microemulsion surface can absorb different kinds of metal ion compounds, such as an aluminum hydroxide, an aluminum phosphate, a ferric hydroxide and a calcium phosphate. Adsorption of the metal ion compound by the microemulsion does not affect the stability of the original microemulsion, and the microemulsion absorbing the metal ion compound is high in dispersibility and simple in operation, and easy to use clinically.

The term "microemulsion" includes dispersions, droplets and other lipid structures formed in a manner that when water-insoluble oil phase is mixed with the aqueous phase, non-polar residues (namely a long hydrocarbon chain) keep away from water due to a hydrophobic force, and polar head groups face the water. Such lipid structure includes, but is not limited to, mono-layered, few-layered and multi-layered lipid vesicles, micelles and lamellar structures.

The term "metal ion compound" refers to a compound consisting of metal cations and anions in the broad sense of art. The metal ions described in the disclosure are one or more selected from aluminum, iron, zirconium, calcium, manganese, cadmium, magnesium, cerium, cadmium, cobalt, gallium or zinc, and the metal ion compound is in the form of inorganic salts or organic compounds; preferably, the metal ion compound is hydroxides or phosphates of the metal ions; and particularly and preferably, the metal ion compound is one or more of aluminum hydroxide, ferric hydroxide, aluminum phosphate, calcium phosphate and zinc hydroxide.

The term "surfactant" refers to any molecule with polar head groups (liable to be hydrosolvated in energy) and hydrophobic tails (poor in hydrosolvation degree). The term "cationic surfactant" refers to a surfactant with cationic head groups. The term "anionic surfactant" refers to a surfactant with anionic head groups. The term "non-ionic surfactant" refers to a surfactant without electric head groups. The term "zwitterionic surfactant" refers to a surfactant with cationic and anionic groups.

The term "pharmaceutically acceptable" refers to components without causing adverse allergic reactions or adverse immune reactions in nature when being administrated to hosts (such as animals or human beings). Such preparation includes any pharmaceutically acceptable dosage form. The examples of such pharmaceutically acceptable dosage forms include, but are not limited to, impregnating, spraying, externally applying, injecting and lyophilized dosage forms.

The aqueous phase in the microemulsion can include any type of aqueous phase, including but not limited to water (such as water, distilled water, purified water, water for injection, deionized water and tap water) and solutions (such as a HEPES solution), and the aqueous phase can be further sterile and pyrogen-free. Preferably, the aqueous phase of the microemulsion is the water for injection.

The oil phase is any cosmetically or medically acceptable oil; preferably, the oil phase can be selected from animal oil, vegetable oil, natural oil, synthetic oil, hydrocarbon oil and silicone oil, and semi-synthetic derivatives and combinations thereof.

More preferably, the oil applicable for the microemulsion includes, but is not limited to, mineral oil, squalene oil, fat having 6 to 30 carbon atoms and aromatic acids and alcohols thereof, soybean oil, medium chain triglyceride, essence oil, silicone oil, essential oil, water-insoluble vitamins, isopropyl stearate, butyl stearate, octyl palmitate, hexadecyl palmitate, tridecyl behenate, diisopropyl adipate, dioctyl sebacate, menthol phthalate, hexadecyl octanoate, octyl salicylate, isopropyl myristate, neopentyl glycol hexadecanol diacetate, Ceraphyls®, decyl oleate, diisopropyl adipate, alkyl lactate having 12 to 15 carbon atoms, hexadecyl lactate, lauryl lactate, isostearyl neopentanoate, myristin, isostearic stearate, octyl stearate, hydrocarbon oil, isoprene, liquid paraffin, isododecane, vaseline, Argan oil, rapeseed oil, Chile oil, coconut oil, corn oil, cottonseed oil, flaxseed oil, grape seed oil, mustard oil, olive oil, palm oil, palm kernel oil, peanut oil, pine nut oil, poppy seed oil, pumpkin kernel oil, rice bran oil, safflower oil, tea oil, truffle oil, vegetable oil, apricot (kernel) oil, jojoba oil (*Simmondsia chinensis* montmorillonite seed oil), grape oil, macadamia nut oil, wheat germ oil, almond oil, rapeseed oil, gourd oil, soybean oil, sesame oil, hazelnut oil, corn oil, sunflower oil, hemp-seed oil, Boyce oil, bitter almond oil, avocado oil, walnut oil, fish oil, berry oil, allspice oil, juniper seed oil, seed oil, apricot seed oil, fennel seed oil, celery seed oil, cumin seed oil, nutmeg seed oil, leaf oil, basil leaf oil, bay leaf oil, cinnamon leaf oil, sage leaf oil, eucalyptus leaf oil, lemon grass leaf oil, melaleuca leaf oil, oregano leaf oil, patchouli leaf oil, mint leaf oil, pine needle oil, rosemary leaf oil, spearmint leaf oil, tea tree leaf oil, thyme leaf oil, winter patchouli oil, flower oil, chamomile oil, sage oil, clove oil, geranium flower oil, hyssop flower oil, jasmine flower oil, lavender flower oil, manuka flower oil, mallow flower oil, orange flower oil, rose oil, ylang flower oil, bark oil, cinnamon oil, cinnamon bark oil, sassafras bark oil, wood oil, camphor wood oil, cedar wood oil, rosewood oil, sandalwood oil, rhizome (ginger) wood oil, resin oil, frankincense oil, myrrh oil, peel oil, bergamot peel oil, pummelo peel oil, lemon peel oil, lime peel oil, orange peel oil, orange peel oil, root oil, valerian oil, oleic acid, linoleic acid, isostearyl alcohol, methylphenylpolysiloxane, sago silicone, dimethylsiloxane, phenyltrimethylsiloxane (or organic modified version thereof), alkylated derivatives of polysiloxane, cetyldimethylsiloxane, dodecyltrimethylsiloxane, hydroxylated derivatives of polysiloxane, volatile silicone oil, cyclic and linear silicone oil, cyclomethicone, hexamethylcyclotrisiloxane oil, octamethylcyclotetrasilicone oil, decamethylcyclopentane silicone oil, volatile linear dimethicone, isohexadecane, isoeicosane, isotetraacetic acid, polyisobutylene, isooctane, isododecane, terpene, monoterpene, sesquiterpene, carmine, azurol, menthol, camphor, Rhizoma Paridis, thymol, nerol, linalool, limonene, geraniol, perillyl alcohol, nerol, farnesol, ylang gene, bisabolol, farnesene, ascaridol, veratrum oil, citronellal, citral, citronellol, vegulin, Yarrow, guaiacene, chamomile, and semi-synthetic derivatives or combinations thereof.

Particularly and preferably, the oil phase is one or combinations of more than one of the squalene, the soybean oil, the medium chain triglyceride and the oleic acid.

The surfactants in the microemulsion-based vaccine delivery system of the disclosure can be ionic surfactants acceptable in pharmacies, non-ionic surfactants acceptable in pharmacies, and cationic surfactants acceptable in pharmacies, anionic surfactants acceptable in pharmacies or zwitterionic surfactants acceptable in pharmacies. *Applied Surfactants: Principles and Applications* describes exemplary applications of the surfactants. (Tharwat F. Tadros, Copyright 8 2005 WILEY-VCH Verlag GmbH & Co. KGaA, Weinheim ISBN: 3-527-30629-3) is hereby incorporated particularly by reference.

Furthermore, the surfactants can be ionic polymeric surfactants acceptable in medicines, non-ionic polymeric surfactants acceptable in medicines, cationic polymeric surfactants acceptable in medicines, and anionic polymeric surfactants acceptable in medicines or zwitterionic polymeric surfactants acceptable in medicines. The examples of the polymeric surfactants include, but are not limited to, a graft copolymer of a poly(methyl methacrylate) backbone with multiple (at least one) polyethylene oxide (PEO) side chains, a polyhydroxystearic acid, alkoxylated alkylphenol formaldehyde condensation substances, polyalkyl glycol modified polyesters with fatty acids, polyesters, and semi-synthetic derivatives or combinations thereof.

The surface-active components or the surfactants are amphipathic molecules, and consist of non-polar hydrophobic portions (generally linear chain or branch chain hydrocarbons or fluorocarbon chains containing 8-18 carbon atoms), and attached to polar or ionic hydrophilic portions. The hydrophilic portions may be non-ionic, ionic, or zwitterionic. In a water environment, the interaction between a hydrocarbon chain and water molecules is weak, while the interaction between the polar or ionic head groups and the water molecules is strong by interaction with dipoles or ion dipoles. According to the property of hydrophilic groups, the surfactants may be divided into anionic surfactants, cationic surfactants, zwitterionic surfactants, non-ionic surfactants and polymeric surfactants.

Preferably, the proper surfactants in the microemulsion include, but are not limited to, ethoxylated nonylphenol, ethoxylated undecanol, polyoxyethylene sorbitan monolaurate, polyoxyethylene sorbitan palmitate, polyoxyethylene sorbitan monostearate, polyoxyethylene sorbitan monooleate, dehydrated sorbitan fatty acid esters (Span), ethoxylated hydrogenated castor oil, sodium dodecylsulfate, ethoxy and propoxy diblock copolymers, ethylene oxide-propylene oxide block copolymers, tetrafunctional block copolymers based on ethylene oxide and propylene oxide, monoglyceride, caproin, caprylin, glyceryl cocoate, glyceryl erucate, glyceryl hydroxystearate, glyceryl isostearate, glyceryl lanate, glyceryl laurate, glyceryl linoleate, glyceryl myristate, glyceryl oleate, PABA glyceride, glyceryl palmitate, glyceryl ricinoleate, glyceryl stearate, glyceryl thioglycolate, glyceryl dilaurate, glyceryl dioleate, glyceryl myristate, glyceryl tetraoleate, glyceryl stearate, glycerylamide stearate, glyceryl dilaurate, diolein, diglyceride, glycerol diacetate, glycerol tetraoleate, glyceryl stearate, polyoxyethylene aliphatic ether, polyoxyethylene lauryl ether, polyoxyethylene stearic ether, polyoxyethylene myristicin, steroid, cholesterol, beta-sterols, bisphenol alcohols, alcohol fatty acid ester, isopropyl myristate, fatty acid isopropyl ester, isopropyl n-butyrate, isopropyl n-hexanoate, isopropyl n-decanoate, isopropyl palmitate, octyl dodecyl myristate, alkoxylated alcohol, alkoxylated acid, alkoxylated amide, alkoxylated glycoside derivatives, alkoxylated derivatives of natural oil and wax, polyoxyethylene-polyoxypropylene block copolymers, nonoxyl-14, PEG-8 laurate, PEG-6 cocamide, PEG-20 methyl glucose sesquigallate, PEG-40 lanolin, PEG-40 castor oil, PEG-40 hydrogenated castor oil, polyoxyethylene aliphatic ether, diglyceride, polyoxyethylene stearic ester, polyoxyethylene myristic ether, polyoxyethylene lauryl ether, glyceryl dilaurate, glyceryl distearate, glyceryl laurate, glyceryl myristate, glyceryl dilaurate, and semi-synthetic derivatives and combinations thereof.

Wherein, the non-ionic surfactants include, but are not limited to, poloxamer, polyethylene glycol cholesterol, polyethylene glycol polylactic acid (PEG-PLA), polyethylene glycol polyglycolic acid (PEG-PLG), polyethylene glycol-poly(lactic-co-glycolic acid (PEG-PLGA), tocopherol polyethylene glycol succinate (TPGS), polyethylene glycol 660-12-hydroxystearate (HS-15), polyoxyethylene-8-octyl and decyl labrasol (Labrasol), distearoyl phosphatidylethanolamine-polyethylene glycol (DSPE-PEG), ethylene glycol monoethyl ether (Transcutol), ethoxylated surfactants, ethoxylated alcohol, ethoxylated alkylphenol, ethoxylated fatty acid, ethoxylated monoethanolamine, ethoxylated sorbitol ester, ethoxylated aliphatic amine, ethylene oxide-propylene oxide copolymers, bis(polyethylene glycol bis[imidazolyl carbonyl]), nonanol-9, bis(polyethylene glycol bis[imidazolyl carbonyl]), Brij®35, Brij®56, Brij®72, Brij®76, Brij®92V, Brij®97, Brij®58P, Cremophor®EL, decanediol monododecyl ether, N-capryl-N-methylglucamine, N-capryl alpha-D-pyranoside, decyl beta-D-methylglucamine, N-dodecyl-N-methylglucamine, N-dodecyl alpha-D-maltoside, N-dodecyl beta-D-maltoside, heptaethylene glycol monodecyl ether, hexaethylene glycol monododecyl ether, heptaethylene glycol monotetradecyl ether, N-hexadecyl beta-D-maltoside, hexathylene glycol monododecyl ether, hexathylene glycol monohexadecyl ether, hexathylene glycol monooctadecyl ether, hexathylene glycol monooctadecyl ether and monotetradecyl ether, Igepal CA-630, methyl-6-O-(N-heptylamino)-alpha-D-glycopyranoside, non-glycol monododecyl ether, N-nonyl-N-methylglucamine, N-nonyl-N-methylglucamine, octaglycol monododecyl ether, octaglycol monohexadecyl ether, octyl glycol monooctadecyl ether, octyl glycol monotetradecyl ether, octyl beta-D-pyranoside, pentamethylene glycol monodecyl ether, pentamethylene glycol monododecyl ether, pentamethylene glycol monohexadecyl ether, pentamethylene glycol monohexyl ether, pentamethylene glycol monooctadecyl ether, pentamethylene glycol monooctyl ether, pentamethylene glycol diglycidyl ether, polyethylene glycol ether W-1, polyoxyethylene 10 trialkyl ether, polyoxyethylene 100 stearate, polyoxyethylene 20 isohexadecyl ether, polyoxyethylene 20 oleate, polyoxyethylene 40 stearate, polyoxyethylene 50 stearate, polyoxyethylene 8 stearate, polyoxyethylene bis(imidazolyl carbonyl), polyoxyethylene 25-propylene glycol stearate, Quillaja bark saponin, Span®20, Span®40, Span®60, Span®65, Span®80, Span®85, 15-S-12 type Tergitol, 15-S-30 type Tergitol, 15-S-5 type Tergitol, 15-S-7 type Tergitol, 15-S-9 type Tergitol, NP-10 type Tergitol, NP-4 type Tergitol, NP-40 type Tergitol, NP-7 type Tergitol, NP-9 type Tergitol, TMN-10 type Tergitol, TMN-6 type Tergitol, tetradecyl beta-D-maltoside, tetraethylene glycol monododecyl ether, tetraethylene glycol monotetradecyl ether, tetraethylene glycol monododecyl ether, triethylene glycol monodecyl ether, triethylene glycol monododecyl ether, triethylene glycol monohexadecyl ether, triethylene glycol monooctyl ether, triethylene glycol monotetradecyl ether, Triton CF-21, Triton CF-32, Triton DF-12, Triton DF-16, Triton GR-5M, Triton QS-15, Triton QS-44, Triton X-100, Triton X-102, Triton X-15, Triton X-151, Triton X-200, Triton X-207, Triton®X-100, Triton®X-114, Triton®X-165, Triton®X-305, Triton®X-405, Triton®X-45, Triton®X-705-70, TWEEN®20, TWEEN®21, TWEEN®40, TWEEN®60, TWEEN®61, TWEEN®65, TWEEN®80, TWEEN®81, TWEEN®85, Tyloxapol, n-hendecyl beta-D-pyranoside, and semi-synthetic derivatives and combinations thereof.

The cationic surfactants include, but are not limited to, quaternary ammonium compounds, alkyl trimethyl ammonium chloride compounds, dialkyl dimethyl ammonium chloride compounds and cationic halogen-containing compounds, such as cetylpyridinium chloride, benzalkonium chloride, benzyl dim ethylcetylammonium chloride, tetradecyldimethylbenzylammonium chloride, benzyldodecyldimethylammonium bromide, benzyltrimethylammonium tetrachloroiodate, dimethyloctadecylammonium bromide, dodecyldimethylammonium bromide, dodecyltrimethylammonium bromide, cetyldimethylammonium bromide, Girard's reagents T, cetyltrimethylammonium bromide, N,N',N'-polyoxyethylene(10)-N-ester-1,3-diaminopropane, benzylammonium bromide, trimethyl (tetradecyl) ammonium bromide, 1,3,5-triazine-1,3,5(2H, 4H, 6H)-triethanolamine, 1-decylamine, N-Decyl-N,N-dimethyl-chloride, didecyldimethylammonium chloride, 2-(2-(p-(di-isobutyl) methoxy) ethoxy) ethyldimethylbenzylammonium chloride, 2-(2-(p-(di-isobutyl) phenoxy) ethoxy) ethyldimethylbenzylammonium chloride, alkyl 1 or 3 benzyl-1-(2-hydroxyethyl)-2-imidazoline chloride, alkyl bis(2-hydroxyethyl) benzylammonium chloride, alkyldemethylated benzylammonium chloride, alkyldimethyl 3,4-dichlorobenzyl ammonium chloride (100% C12), alkyldimethyl 3,4-dichlorobenzyl ammonium chloride (50% C14, 40% C12, 10% C16), alkyldimethyl 3,4-dichlorobenzyl ammonium chloride (55% C14, 23% C12, 20% C16), alkyldimethylbenzylammonium chloride, alkyldimethylbenzylammonium chloride (100% C14), alkyldimethylbenzylammonium chloride (100% C16), alkyldimethylbenzylammonium chloride (41% C14, 28% C12), alkyldimethylbenzylammonium chloride (47% C12, 18% C14), alkyldimethylbenzylammonium chloride (55% C16, 20% C14), alkyldimethylbenzylammonium chloride (58% C14, 28% C16), alkyldimethylbenzylammonium chloride (60% C14, 25% C12), alkyldimethylbenzylammonium chloride (61% C11, 23% C14), alkyldimethylbenzylammonium chloride (61% C12, 23% C14), alkyldimethylbenzylammonium chloride (65% C12, 25% C14), alkyldimethylbenzylammonium chloride (67% C12, 24% C14), alkyldimethylbenzylammonium chloride (67% C12, 25% C14), alkyldimethylbenzylammonium chloride (90% C14, 5% C12), alkyldimethylbenzylammonium chloride (93% C14, 4% C12), alkyldimethylbenzylammonium chloride (95% C16, 5% C18), alkyldimethylbenzylammonium chloride, alkyl didecyl dimethyl ammonium chloride, alkyldimethylbenzylammonium chloride (C12-16), alkyldimethylbenzylammonium chloride (C12-18), dialkyldimethylbenzylammonium chloride, alkyldimethyldimethylbenzylammonium chloride, alkyldimethylethylammonium bromide (90% C14, 5% C16, 5% C12), alkyldimethylethylammonium bromide (mixed alkyl and vinyl oils in soybean fatty acids), alkyldimethylethylbenzylammonium chloride, alkyldimethylethylbenzylammonium chloride (60% C14), alkyldimethylisopropylbenzylammonium chloride (50% C12, 30% C14, 17% C16, 3% C18), alkyltrimethylammonium chloride (58% C18, 40% C16, 1% C14, 1% C12), alkyltrimethylammonium chloride (90% C18, 10% C16), alkyldimethyl (ethylbenzyl) ammonium chloride (C12-18), bis(C8-10)-alkyldimethylammonium chloride, dialkyldimethylammonium chloride, di alkylmethylbenzylammonium chloride, di alkyl dimethylammonium chloride, diisodecyldimethylammonium chloride, diisooctyldimethylammonium chloride, dodecyl bis(2-hydroxyethyl)octylammonium hydrogen chloride, dodecyl dimethylbenzylammonium chloride, dodecylcarbamylmethyldiethylbenzylammonium chloride, heptaalkylhydroxyethyl imidazoline chloride, hexahydro-1,3,5-tri-(2-hydroxyethyl)-s-triazine, hexahydro-1,3,5-tri (2-hydroxyethyl)-s-triazine, myristate ammonium chloride (and) quaternary ammonium salt 14, N,N-dimethyl-2-hydroxypropylammonium chloride polymer, N-tetradecyldimethylbenzylammonium chloride monohydrate, octyldecyldimethylammonium chloride, octyldodecyldimethylammonium chloride, octylphenoxyethoxyethyldimethylbenzylammonium chloride, oxydiethyl bis(alkyldimethylammonium chloride) quaternary ammonium compound, dichloroalkyldimethylchloride, trimethoxysilylpropyldimethyloctadecylammonium chloride, trimethoxysilicaquaternary ammonium salt, trimethoxydodecylbenzylammonium chloride, and semi-synthetic derivatives and combinations thereof.

The proper anionic surfactants include, but are not limited to, carboxylate, sulfate, sulfonate, phosphate, phosphatidic acid, chenodeoxycholic acid, sodium chenodeoxycholate, cholic acid, bovine or sheep bile, dehydrocholic acid, deoxycholic acid, methyl deoxycholate, digoxin, N, N-dimethyldodecylamine N-oxide, sodium laurate, sodium cholate, hydrated glycocholic acid, monohydrate glycocholic acid, 3-disodium glycocholate sulfate, ethyl glycocholate, N-lauroyl sodium sarcosinate, N-lauroyl sarcosinate solution, lithium dodecyl sulfate, Lugol solution, 4 type Niaproof, sodium 1-octanesulfonate, sodium 1-butanesulfonate, sodium 1-decanesulfonate, sodium 1-decanesulfonate, sodium 1-dodecanesulfonate, anhydrous sodium 1-heptanesulfonate, anhydrous sodium 1-heptanesulfonate, sodium 1-nonanesulfonate, sodium 1-propanesulfonate, sodium 2-bromoethanesulfonate, hydrated sodium cholate, sodium cholate, sodium deoxycholate, sodium dodecylsulfate, anhydrous sodium ethanesulfonate, sodium octylsulfate, anhydrous sodium pentanesulfonate, sodium taurocholate, sodium taurodeoxycholate, sodium taurodeoxycholate hydrate, taurocholic acid 3-disodium sulfate, Trizma® dodecylsulfate, ursodeoxycholic acid, fat having 6 to 30 carbon atoms and salts of aromatic acid thereof, and semi-synthetic derivatives and combinations thereof.

The zwitterionic surfactants include, but are not limited to, N-alkylbetaine, dodecylaminopropyldimethylbetaine, alkyldimethylglycinate, N-alkylaminopropionate, CHAPS, CHAPSO, 3-(decyldimethylamino) propanesulfonate inner salt, 3-(dodecyldimethylamino) propanesulfonate inner salt, 3-(N,N-dimethylmyristylamino) propanesulfonate inner salt, 3-(N,N-dimethyloctadecylamino) propanesulfonate, 3-(N,N-dimethyloctylamino) propanesulfonate inner salt, 3-(N,N-dimethylpalmitylamino) propanesulfonate, soybean lecithin, egg yolk lecithin, phosphatidyl glycerol, phosphatidyl ethanolamine, phosphatidyl serine, phosphatidyl inositol, phosphatidyl choline, sphingomyelin, and semi-synthetic derivatives and combinations thereof. More preferably, the emulsifieris one or combinations of more than one of Tween 80, DSPE-PEG, egg yolk lecithin and Span 85.

One of the purposes of the disclosure is to provide the microemulsion-based vaccine delivery system, wherein the oil phase and emulsifier of the microemulsion contain one or combinations of more than one of carboxyl group, phosphoryl, sulfonyl hydroxide, sulphate group, sulfite group, phenolic hydroxyl, enol group and boric acid group, and the oil phase and the emulsifier include, but are not limited to, fat having 6 to 30 carbon atoms and an aromatic acid thereof, an oleic acid, a linoleic acid, an iso-tetra-acetic acid, thymol, bisphenol alcohol, DSPE-PEG, the anionic surfactants and the zwitterionic surfactants.

One of the purposes of the disclosure is to provide the microemulsion-based vaccine delivery system, wherein the particle size of the microemulsion is smaller than 1000 nm, preferably smaller than 300 nm, and particularly and preferably smaller than 200 nm.

One of the purposes of the disclosure is to provide the microemulsion-based vaccine delivery system wherein the pH value of the microemulsion is from 4.0 to 10.0, preferably from 5.0 to 9.0, and particularly and preferably from 6.0 to 8.0.

Additive applicable for the microemulsion vaccine of the disclosure include but are not limited to one or more solvents, such as medically acceptable preservatives, pH regulators, buffer solutions, organic solvents, chelating agents, antioxidants, filling agents, colorants and excipients, and the additive can be mixed into the previously emulsified microemulsion, or the additive compound is added into the original mixture for emulsification.

One of the purposes of the disclosure is to provide the microemulsion-based vaccine delivery system, wherein the preservatives include, but are not limited to, cetylpyridinium chloride, benzalkonium chloride, benzyl alcohol, chlorhexidine, imidazolidinyl urea, phenol, potassium sorbate, benzoic acid, cresol, chlorocresol, p-benzoate, phenoxyethanol, sorbic acid, alpha-tocopherol, ascorbic acid, ascorbyl palmitate, butylhydroxyanisole, butylated hydroxytoluene, sodium ascorbate, sodium pyrosulfite, citric acid, edelic acid, and semi-synthetic derivatives and combinations thereof. The preservatives include, but are not limited to, one or more of benzyl alcohol, chlorhexidine (bis(P-chlorophenyldiguidine)hexane), chlorpheniramine (3-(-4-chloryl)-propane-1,2-diol), Kathon CG (methyl and methylchloroisothiazolinone), Nipagin ester (methyl, ethyl, propyl, butyl benzoate), phenoxyethanol (2-phenoxyethanol), Phenonip (phenoxyethanol, methyl, ethyl, butyl, propyl p-hydroxybenzoate), Phenoroc, Liquipar Oil, Liquipar PE, Nipaguard MPA, methylparaben sulfonate (propylene glycol, methylparoban and propyl ester), Nipagin peptide (methylparoban, ethyl and propyl ester), Nipagin ester (methylparoban, butyl, ethyl and propyl ester), Elestab 388 and Killitol.

One of the purposes of the disclosure is to provide the microemulsion-based vaccine delivery system wherein the pH regulator includes, but is not limited to HEPES, diethanolamine, lactic acid, monoethanolamine, triethylamine, sodium hydroxide, sodium phosphate, and semi-synthetic derivatives and combinations thereof. Furthermore, the microemulsion may include chelating agents, and the examples of the chelating agents include, but are not limited to, one or more of ethylenediamine, an ethylenediamine tetraacetic acid (EDTA), a phytic acid, a polyphosphoric acid, a citric acid, a gluconic acid, an acetic acid, a lactic acid and dimercaprol.

One of the purposes of the disclosure is to provide the microemulsion-based vaccine delivery system, wherein the buffering agents include, but are not limited to, 2-amino-2-methyl-1,3-propanediol, 2-amino-2-methyl-1-propanol, L-(+)-tartaric acid, ACES, ADA, acetic acid, ammonium acetate solution, ammonium bicarbonate solution, diammonium citrate solution, ammonium formate solution, ammonium oxalate monohydrate, diammonium phosphate solution, monoammonium phosphate solution, disodium phosphate tetrahydrate solution, ammonium sulfate solution, ammonium tartrate diacid solution, BES buffered saline solution, BICINE buffer solution, BIS-TRIS, sodium bicarbonate buffer solution, boric acid, CAPS, CHES, calcium acetate hydrate, concentrated citrate solution, citric acid, diethanolamine, EPPS, formic acid solution, glycine-glycine-glycine, glycine-glycine, glycine, HEPES buffered saline, imidazole buffer solution, lipoprotein renaturation buffer solution, lithium acetate dihydrate, lithium citrate tribasic tetrahydrate, MES solution, MOPS, magnesium acetate solution, magnesium citrate tribasic non-hydrate, magnesium formate solution, magnesium phosphate dibasic trihydrate, oxalic acid dihydrate, PIPES, phosphate buffer salt, peroxidase complex washing buffer solution, piperazine, D-potassium tartrate, potassium acetate solution, potassium bicarbonate, potassium carbonate, potassium chloride, potassium citrate monoacid salt, potassium citrate triacid salt solution, potassium formate solution, potassium oxalate monohydrate, potassium dihydrogen phosphate, potassium phthalate, sodium potassium tartrate solution, potassium sodium tartrate tetrahydrate, potassium tetraborate tetrahydrate, potassium tetraoxalate tetrahydrate, propionic acid solution, STE buffer solution, sodium 5,5-diethylbarbiturate, sodium acetate solution, sodium bicarbonate, sodium tartrate monohydrate, sodium carbonate, sodium citrate solution, sodium formate solution, sodium oxalate, sodium dihydrogen phosphate solution, sodium dihydrogen phosphate solution, sodium phosphate solution, sodium pyrophosphate binary solution, sodium pyrophosphate quaternary decahydrate solution, sodium tartrate binary solution, sodium tetraborate decahydrate, TAPS, TES, TM buffer solution, TNT buffer solution, triglycine buffer solution, diethyl triacetate EDTA buffer solution, sodium dodecyl triglycine sulfate buffer solution, ethylenediamine triphosphate tetraacetate buffer solution, triazine, triethanolamine, triethylamine, triethylamine acetate buffer solution, triethylammonium phosphate solution, trimethylammonium acetate solution, trimethylammonium phosphate solution, Tris-EDTA buffer solution, Trizma® acetate and Trizma® alkali.

One of the purposes of the disclosure is to provide the microemulsion-based vaccine delivery system, wherein the organic solvents include, but are not limited to, alcohol having 1 to 12 carbon atoms, diol, triol, dialkylphosphate, trialkyphosphate (such as tri-n-butyl phosphate), ethanol, methanol, isopropanol, glycerol, medium chain triglyceride, ethyl ether, ethyl acetate, acetone, dimethyl sulfoxide (DMSO), acetic acid, n-butanol, butanediol, flavor alcohol, isopropanol, n-propanol, formic acid, propylene glycol, sorbitol, industrial methylated liquor, glycerin triacetate, hexane, benzene, toluene, diethyl ether, chloroform, 1,4-dioxane, tetrahydrofuran, dichloromethane, acetone, acetonitrile, dimethylformamide, dimethyl sulfoxide, formic acid, and semi-synthetic derivatives and combinations thereof.

One of the purposes of the disclosure is to provide the microemulsion-based vaccine delivery system, wherein the microemulsion further includes additive, and the additive includes, but is not limited to, antioxidants (such as vitamin C, and vitamin E), flavoring agents (such as glucose and xylitol), osmotic regulators (such as glycerol), thickeners (such as carrageenan and pectin), filling agents (such as starch), coloring agents (lemon yellow and sunset yellow), excipients (Arabic gum syrup), etc.

One of the purposes of the disclosure is to provide the microemulsion-based vaccine delivery system, wherein the vaccine is prepared from the microemulsion absorbing the metal ion compound and by adding the antigen through direct surface absorption or hydrophobic interaction.

One of the purposes of the disclosure is to provide the microemulsion-based vaccine delivery system, wherein the antigen includes, but are not limited to, one or combinations of more than one of proteins, polypeptides, nucleic acids, oligosaccharides, polysaccharides, tumor cell lysates, bacterial lysates, bacterial cell membranes, mycoplasma cell membranes, chlamydia cell walls, spirochetes, rickettsia microcapsules, viral envelopes, exosomes, viruses or bacterial lysate antigen, viruses or bacterial outer membrane vesicle antigen, tumor cell membrane vesicle antigen, tumor cell exosome antigen, model antigen chicken ovalbumin (OVA), etc.

Preferably, the antigen is one or combinations of more than one of model antigen chicken ovalbumin (OVA) and melanoma antigen peptide GP100 (ITDQVPFSV).

One of the purposes of the disclosure is to provide the microemulsion-based vaccine delivery system, wherein the microemulsion absorbing the metal ion compound has an effect of the adjuvant, and different adjuvant combinations can be added to further improve the immune response; the additional adjuvants include, but are not limited to, one or combinations of more than one of antigen-related molecular pattern adjuvants: Toll-like receptor stimulant, such as peptidoglycan, lipoteichoic acid, MPLA, imiquimod, Resiquimod, CpG-ODN, bacterial flagellin, Poly I:C; RIG-I-like receptor agonists: 3pRNA, short double-chain RNA; NOD-like receptor agonists: muramyl dipeptide (MDP), N-acetylglucosamine; C-type lectin receptor: beta-glucan, trehalose diborate; STING agonists, such as cGAMP; bacterial toxins and derivatives thereof: cholera toxin (CT), *Escherichia coli* heat-intolerant enterotoxin (LT), cholera toxin B subunits; saponins: QS21, tomatine, and Quil-A; cytokines: GM-CSF, IL-2, IL-12, IL-6, IFN-gamma, Flt-3, and lymphotactin; and other adjuvants: heat shock protein, A151, GTP-GDP, sodium fluoride, alkylpolypropylene ester polymer and dimethyldioctadecyl quaternary ammonium bromide (DDA). Preferably, the additional adjuvant is one or combinations of more than one of CpG 1826 and A151.

One of the purposes of the disclosure is to provide the microemulsion-based vaccine delivery system, wherein the microemulsion includes the following components in parts by weight: a proper amount of the aqueous phase, 0.01%-50% of the oil phase, 0.001%-10% of the emulsifier, 0.0001%-1% of the metal ion compound and 1%-0.0001% of the antigen.

Preferably, the microemulsion-based vaccine delivery system, wherein the microemulsion includes the following components in parts by weight: a proper amount of the aqueous phase, 0.1%-5% of the oil phase, 0.01%-2% of the emulsifier, 0.001%-1% of the metal ion compound and 0.1%-0.0001% of the antigen.

Preferably, the microemulsion-based vaccine delivery system, wherein the microemulsion includes the following components in parts by weight: a proper amount of water for injection, 0.1%-5% of the squalene, 0.01%-2% of the Tween 80, 0.01%-2% of the Span 85, 0.01%-2% of DSPE-PEG, 0.01%4% of the aluminum hydroxide and 0.1%-0.001% of the model antigen chicken ovalbumin OVA.

Preferably, the microemulsion-based vaccine delivery system, wherein the microemulsion includes the following components in parts by weight: a proper amount of water for injection, 0.1%-5% of the soybean oil, 0.1%-5% of the medium-chain triglycerides, 0.01%-2% of the egg yolk lecithin, 0.01%-2% of DSPE-PEG, 0.1%-0.001% of the ferric hydroxide and 0.01%-0.0001% of the melanoma antigen peptide GP100.

More preferably, the microemulsion-based vaccine delivery system, wherein the microemulsion includes the following components in parts by weight: a proper amount of water for injection, 0.1%-2% of the squalene, 0.1%-2% of the Tween 80, 0.1%-2% of the Span 85, 0.1%-2% of DSPE-PEG, 0.01%-0.1% of the aluminum hydroxide and 0.1%-0.01% of the model antigen chicken ovalbumin OVA.

More preferably, the microemulsion-based vaccine delivery system, wherein the microemulsion includes the following components in parts by weight: a proper amount of water for injection, 0.1%-2% of the soybean oil, 0.1%-2% of the medium chain triglycerides, 0.1%-2% of the egg yolk lecithin, 0.1%-2% of DSPE-PEG, 0.01%-0.001% of the ferric hydroxide and 0.01%-0.001% of the melanoma antigen peptide GP100.

Preferably, the microemulsion-based vaccine delivery system, wherein it further includes one or more of the additional adjuvants CpG 1826 and A151, and the content of the additional adjuvants is 0.1%-0.001%.

One purpose of the disclosure is to provide a microemulsion-based vaccine delivery system, wherein a preparation method for the microemulsion includes the following steps:
(1) dissolving lipophilic emulsifier into the oil phase, dissolving hydrophilic emulsifier into the aqueous phase, and fully mixing them to form a microemulsion;
(2) adding a pH buffer solution and/or an anion portion of the metal ion compound into the above microemulsion;
(3) adding a cation portion of the metal ion compound into a mixture obtained in step (2);
(4) adding the antigen into the mixture obtained in step (2) or step (3), and evenly mixing them to obtain the microemulsion.

Preferably, the preparation method for the microemulsion includes the following steps:
(1) dissolving the lipophilic emulsifier into the oil phase, dissolving the hydrophilic emulsifier into the aqueous phase, and fully mixing them to form an initial microemulsion, and fully mixing the initial microemulsion with such mixing methods as high-pressure homogenization, ultrasound or high-speed stirring to form the microemulsion;
(2) adding a pH buffer solution and/or an anion portion of the metal ion compound into the above microemulsion;
(3) adding the cation portion of the metallic ion compounds into the mixture prepared in step (2) under the conditions of a vortex, a stirring and an ultrasound, or by a micro-injection pump;
(4) adding the antigen into the mixture which is obtained in step (2) or step (3) to obtain the microemulsion.

One purpose of the disclosure is to provide a microemulsion-based vaccine delivery system, wherein a preparation method for the microemulsion includes the following steps:
(1) dissolving the lipophilic emulsifier into the oil phase, dissolving the hydrophilic emulsifier into the aqueous phase, and fully mixing them to form a microemulsion;
(2) adding the cation portion of the metal ion compound into the above microemulsion;
(3) adding the pH buffer solution and/or the anion portion of the metal ion compound into the mixture obtained in the step (2);
(4) adding the antigen into the mixture which is obtained in step (2) or step (3), and even mixing the mixture to obtain the microemulsion.

Preferably, the preparation method for the microemulsion includes the following steps:
(1) dissolving the lipophilic emulsifier into the oil phase, dissolving the hydrophilic emulsifier into the aqueous phase, fully mixing them to form an initial microemulsion, and fully mixing the initial microemulsion with such mixing methods as high-pressure homogenization, ultrasound or high-speed stirring to form the microemulsion;
(2) adding the cation portion of the metal ion compound into the above microemulsion;
(3) adding the pH buffer solution and/or the anion portion of the metal ion compound into the mixture obtained in step (2) under the conditions of the vortex, stirring and ultrasound, or by the micro-injection pump;

(4) adding the antigen into the mixture which is obtained in step (2) or step (3) to obtain the microemulsion.

The present disclosure selects OVA as the model antigen, and in-vivo and in-vitro experiments prove that the vaccine carrier can induce an antigen-specific humoral and cellular immunity. The disclosure selects OVA or the melanoma antigen peptide GP100 (ITDQVPFSV) as the model antigen, and CpG1826 or A151 as the model adjuvants, and in-vitro experiments prove that the vaccine carrier is capable of achieving dual-delivery of the antigen and nucleic acid adjuvants. As one of the preferred embodiments of the disclosure, the prepared vaccine carrier can be taken up by the DC2.4 antigen-presenting cells efficiently. The vaccine delivery system of the disclosure uses the microemulsion to absorb the metal ion compound, so that the stability is higher; and the microemulsion is not liable to accumulate and high in dispersibility, and is more suitable for clinical use. The particle size of the vaccine delivery system of the disclosure can be smaller than 200 nm, and meet lymph node delivery requirements, and the vaccine delivery system can effectively target the lymph nodes so that the vaccine-targeted delivery is achieved. The vaccine carrier of the disclosure can be taken up by the antigen-presenting cells efficiently, thereby benefiting the generation of the next immune response. Traditional aluminum gel adjuvants easily cause granuloma at an injection site, and are liable to accumulate in the body under some special conditions, such as renal function decline; and high doses of aluminum in the body firstly affect brain and bone tissues and cause severe neurological syndrome and dialysis dementia. Aluminum toxicity is also related to amyotrophic lateral sclerosis and Alzheimer's disease. When the disclosure prepares an aluminum-containing microemulsion vaccine, and as the aluminum content of the vaccine of the disclosure is far lower than that of commercial aluminum gel (Alhydrogel® 2%, American InvivoGene company), the risk of metal ion accumulation and local side effects can be reduced, the toxicity is low, and the patient adaptability is improved.

Compared with the prior art, the present disclosure has the advantages:

1. In the disclosure, the metal ion compound is adsorbed onto the emulsion surface, and a general method for preparing emulsion absorbing the metal ion compound is provided.
2. In the disclosure, the metal ion compound is adsorbed onto the emulsion surface as the vaccine carrier. The emulsions are high in dispersibility and stability, the controllable range of the particle size is wide, and macromolecule antigen entrapment can be realized to achieve lymphatic delivery.
3. In the disclosure, a hydrophilic antigen and a hydrophobic antigen can be entrapped in the same carrier to achieve co-delivery of various antigens with different properties, and to induce the body to generate a comprehensive and effective immune response to pathogen.
4. The vaccine of the present disclosure can be prepared by using auxiliary materials approved by FDA for preparation, it is safe and cheap and suitable for industrial production. The preparation method is simple and fast, the conditions are mild, the denaturation of antigenic proteins will not be caused without the addition of organic reagents, and therefore, the conformation and activity of the antigenic proteins can be effectively maintained.
5. According to the method of the disclosure, which is simple, the microemulsion is prepared by such mixing methods as high-pressure homogenization, ultrasound, and high-speed stirring, and then, the cation portion or the anion portion of the metal ion compound and the antigen are added under the conditions of the vortex, the stirring and the ultrasound, or by the micro-injection pump. The method is applicable in large-scale production, and is conducive to industrial transformation, so it has broad application and market prospects.

BRIEF DESCRIPTION OF THE DRAWINGS

The embodiments of the disclosure will be explained in detail with reference to the drawings.

DETAILED DESCRIPTION OF THE EMBODIMENTS

The following embodiments are the further description of the disclosure, which are not intended to limit the scope of the disclosure. The disclosure will be further described in detail with reference to the embodiments, but for those skilled in the prior art, it should be understood that the disclosure is not limited to these embodiments and the used preparation method. Moreover, equivalent replacement, combination, improvement or modification made to the disclosure by those skilled in the prior art according to the description of the disclosure shall fall within the scope of the disclosure.

Embodiment 1

A preparation method of an aluminum hydroxide microemulsion: 0.2 g of Span 85 is dissolved in 0.5 g of squalene, 0.2 g of Tween 80 is dissolved in water for injection to form an initial microemulsion by mixing, 40 ml of a microemulsion is obtained by high-pressure homogenization of the initial microemulsion, 5 mg of DSPE-PEG powder is added into 1 ml of the microemulsion, and dissolved by stirring, 312.5 µl of 37.5 mM aluminum sulfate aqueous solution is added, 1.75 ml of 100 mM HEPES buffer solutions with a pH value of 8 are added with vortexes, and the pH value is adjusted to neutral to obtain the aluminum hydroxide microemulsion.

Embodiment 2

A preparation method of an aluminum hydroxide microemulsion: 0.35 g of egg yolk lecithin and 0.01 g of Tween 80 are dissolved in water for injection, and mixed with 0.5 g of squalene to obtain an initial microemulsion, and 40 ml of a microemulsion is obtained by high-pressure homogenization of the initial microemulsion. 123 µl of 37.5 mM aluminum sulfate aqueous solution is added into 1 ml of the above microemulsion, 615 µl of 100 mM HEPES buffer solutions with a pH value of 8 are added with vortexes, and the pH value is adjusted to neutral to obtain the aluminum hydroxide microemulsion.

Embodiment 3

A preparation method of an aluminum hydroxide microemulsion: 0.1 g of oleic acid and 0.2 g of Span 85 are dissolved in 0.5 g of squalene, 0.2 g of Tween 80 is dissolved in water for injection to obtain an initial microemulsion by mixing, and 40 ml of a microemulsion is obtained by high-pressure homogenization of the initial microemulsion. 100 µl of 37.5 mM aluminum sulfate aqueous solution is added into 1 ml of the above microemulsion, 550 µl of 100 mM HEPES buffer solutions with a pH value of 8 are added with vortexes, and the pH value is adjusted to neutral to obtain the aluminum hydroxide microemulsion.

Embodiment 4

A preparation method of an aluminum phosphate microemulsion: 0.2 g of Span 85 is dissolved in 0.5 g of squalene, 0.2 g of Tween 80 is dissolved in water for injection to obtain an initial microemulsion by mixing, 40 ml of a microemulsion is obtained by high-pressure homogenization of the initial microemulsion, 5 mg of DSPE-PEG powder is added into 1 ml of the microemulsion, and dissolved by stirring, 1 ml of 5 mM aluminum sulfate aqueous solution is added, and 1 ml of 10 mM sodium phosphate aqueous solution is added with vortexes to obtain the aluminum phosphate microemulsion.

Embodiment 5

A preparation method of a calcium phosphate microemulsion: 0.2 g of Span 85 is dissolved in 0.5 g of squalene, 0.2 g of Tween 80 is dissolved in water for injection to obtain an initial microemulsion by mixing, 40 ml of a microemulsion is obtained by high-pressure homogenization of the initial microemulsion, 5 mg of DSPE-PEG powder is added into 1 ml of the microemulsion, and dissolved by stirring, 1 ml of 10 mM calcium chloride aqueous solution is added, and 1 ml of 6.6 mM sodium phosphate aqueous solution is added with vortexes to obtain the calcium phosphate microemulsion.

Embodiment 6

A preparation method of an aluminum hydroxide microemulsion entrapping OVA: 180 µl of the aluminum hydroxide-containing microemulsion prepared according to embodiment 1 is taken, 20 µl of 2 mg/ml OVA aqueous solution is added into the microemulsion, and incubation is conducted for half an hour at 37° C. to obtain the aluminum hydroxide microemulsion entrapping OVA.

Embodiment 7

A preparation method of an aluminum hydroxide microemulsion entrapping OVA and CpG1826: 160 µl of the aluminum hydroxide-containing microemulsion prepared in embodiment 1 is taken, 20 µl of 2 mg/ml OVA aqueous solution and 20 µl of 200 µg/ml CpG1826 aqueous solution are added into the microemulsion, and incubation is conducted for half an hour at 37° C. to obtain the aluminum hydroxide microemulsion entrapping OVA and CpG1826.

Embodiment 8

A preparation method of an aluminum hydroxide microemulsion entrapping egg white lysozyme: 0.2 g of Span 85 is dissolved in 0.5 g of squalene, and 0.2 g of Tween 80 is dissolved in water for injection to obtain an initial microemulsion by mixing, 40 ml of a microemulsion is obtained by high-pressure homogenization of the initial microemulsion, 5 mg of DSPE-PEG powder is added into 1 ml of the microemulsion, and dissolved by stirring, 1.75 ml of 100 mM HEPES buffer solutions with a pH value of 8 and 100 µl of 4 mg/ml egg white lysozyme aqueous solution is added, and 312.5 µl of 37.5 mM aluminum sulfate aqueous solution is added with vortexes to obtain the aluminum hydroxide microemulsion entrapping the egg white lysozyme.

Embodiment 9

A preparation method of a ferric hydroxide microemulsion entrapping melanoma antigen peptide GP100: 0.5 g of soybean oil, 0.5 g of medium-chain triglycerides and 0.5 g of egg yolk lecithin are evenly mixed, and water for injection is added to obtain an initial microemulsion by mixing; 40 ml of a microemulsion is obtained by high-pressure homogenization of the initial microemulsion, 5 mg of DSPE-PEG powder is added into 1 ml of the microemulsion, and dissolved by stirring, 3 µl of (200 mM) ferric trichloride aqueous solution and approximately 20 µl of (0.1 M) sodium hydroxide solutions are added, the pH value is adjusted to nearly neutral, 10 µl of 7 mg/ml melanoma antigen peptide GP100 (ITDQVPFSV) aqueous solution is added, and evenly mixed to obtain the ferric hydroxide microemulsion entrapping melanoma antigen peptide GP100.

Embodiment 10

Figure 1:
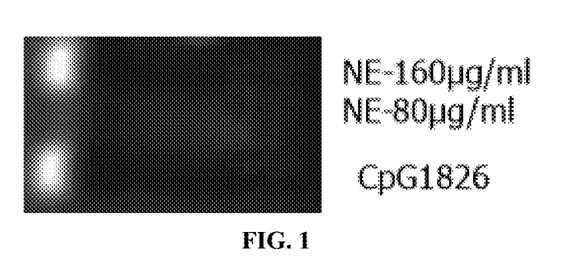
FIG. 1 shows a sephadex electrophoretogram of free CpG 1826 (CpG 1826), 20 μl of an aluminum hydroxide microemulsion entrapping 2.4 μg of CpG 1826 (NE-80 μg/ml), and 20 μl of the aluminum hydroxide microemulsion entrapping 4.8 μg of CpG 1826 (NE-160 μg/ml)

A preparation method of an aluminum hydroxide microemulsion entrapping OVA and nucleotide CpG 1826: 20 µl of aluminum hydroxide-containing microemulsion prepared according to embodiment 6 is taken, 10 µl of an aqueous solution containing 2.4 µg or 4.8 µg of CpG 1826 (with the sequence of 5'-TCCATGAC GTTCCTGACGTT-3') is added, and shaken for half an hour to prepare the aluminum hydroxide microemulsion entrapping OVA and the nucleotide CpG 1826, and then a sephadex electrophoresis test is conducted to test the entrapment capability of the microemulsion for nucleic acid. The result is shown in FIG. 1, that is, 20 µl of the microemulsion can entrap 2.4 µg of CpG 1826. In the figure, CpG 1826 represents free CpG 1826;

NE-80 μg/ml represents that 20 μl of the microemulsion entraps 2.4 μg of CpG 1826, and the final concentration is 80 μg/ml, and NE-160 μg/ml represents that 20 μl of the microemulsion entraps 4.8 μg of CpG 1826, and the final concentration is 160 μg/ml.

Embodiment 11

Figure 2:
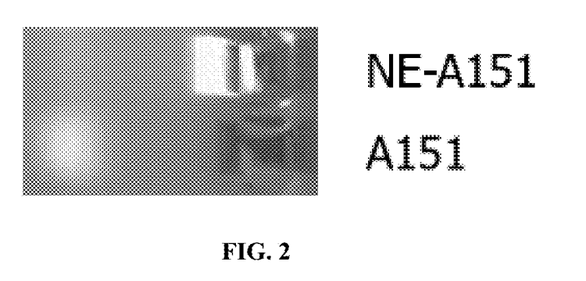
FIG. 2 shows a sephadex electrophoretogram of free A151 (A151), and a ferric hydroxide microemulsion (NE-A151), with 20 μl of the ferric hydroxide microemulsion entrapping 3.0 μg of A151.

A preparation method of a ferric hydroxide microemulsion entrapping nucleotide A151 and melanoma antigen peptide GP100: 20 μl of the ferric hydroxide microemulsion prepared according to embodiment 9 is taken, 3 μg of the nucleotide A151 (with the sequence of TTAGGGTTAGGGTTAGGGTTAGGG) is added, and shaken for half an hour to prepare the ferric hydroxide microemulsion entrapping the nucleotide A151 and the melanoma antigen peptide GP100, and then a sephadex electrophoresis test is conducted to test the entrapment capability of the microemulsion for nucleic acid. The result is shown in FIG. 2, that is, 20 μl of the microemulsion can entrap 3 μg of A151. In the figure, A151 represents free A151, and NE-A151 represents that 20 μl of the microemulsion entraps 3 μg of A151.

Embodiment 12

Determination of particle size of the microemulsion of the microemulsion-based vaccine delivery system: the particle size distribution of the microemulsion containing the metal ion compound in embodiments 1-9 or the vaccine delivery system entrapping the antigen is tested by a Zetasizer Nano ZS90 laser particle size analyzer, 0.1 ml of the microemulsions in the embodiment 1-9 are taken, respectively, 0.9 ml of pure water solution is added for dilution, samples are put into a sample cell, and a temperature for determination is set to 25° C. The results are shown in Table 1, and the results show that the nanoparticle size is 100-150 nm, PDI meets the requirements, and the distribution is uniform.

TABLE 1

Particle sizes of microemulsions containing metal ion compound in embodiments

| Embodiment number | Size (nm) | PDI |
|---|---|---|
| 1 | 120.0 | 0.228 |
| 2 | 144.4 | 0.140 |
| 3 | 124.2 | 0.135 |
| 4 | 128.9 | 0.210 |
| 5 | 116.0 | 0.256 |
| 6 | 125.3 | 0.183 |
| 7 | 145.5 | 0.210 |
| 8 | 131.9 | 0.124 |
| 9 | 133.0 | 0.212 |

Embodiment 13

Figure 3:
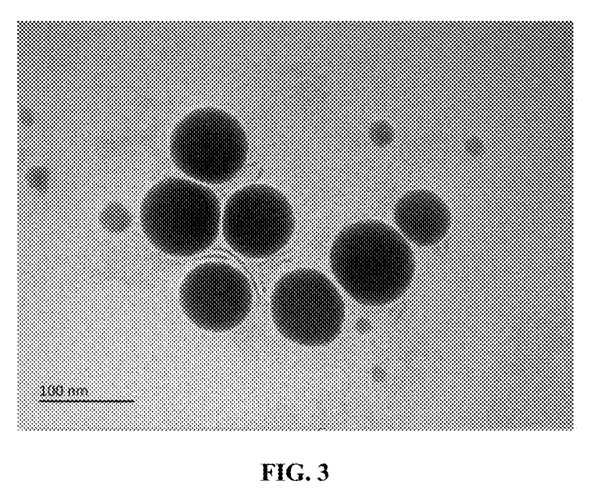
FIG. 3 shows an electron micrograph of the aluminum hydroxide microemulsion prepared in embodiment 1.

Transmission electron microscope of the aluminum hydroxide microemulsion: an aluminum hydroxide microemulsion sample prepared according to embodiment 1 is put onto a copper net, stood for 5 min, and then stained with a phosphotungstic acid for 1 min; next, excess stain is absorbed with a filter paper, the sample is air-dried at room temperature, and observed through the transmission electron microscope under 200 kV. The results are shown in FIG. 3, and it can be known from the test results that the microemulsion is round and intact particles, and the particle size is below 100 nm.

Embodiment 14

Figure 4:
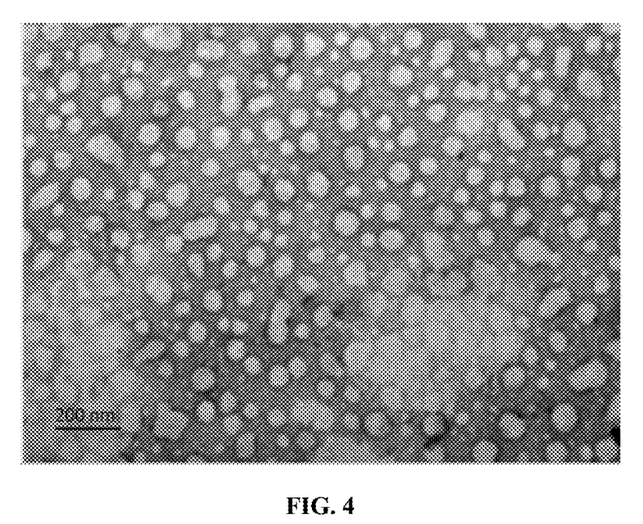
FIG. 4 shows an electron micrograph of the ferric hydroxide microemulsion entrapping the melanoma antigen peptide GP100 and prepared in embodiment 9.

Transmission electron microscope of the ferric hydroxide microemulsion entrapping the melanoma antigen peptide GP100: the ferric hydroxide microemulsion sample entrapping the melanoma antigen peptide prepared according to embodiment 9 is put onto the copper net, stood for 5 min, and then stained for 1 min with the phosphotungstic acid; and next, excess stain is absorbed with the filter paper, the sample is air-dried at room temperature, and observed through the transmission electron microscope under 200 kV. The results are shown in FIG. 4, and it can be known from the test results that the microemulsion is a round and intact particle, and the particle size is below 100 nm.

Embodiment 15

Figure 5:
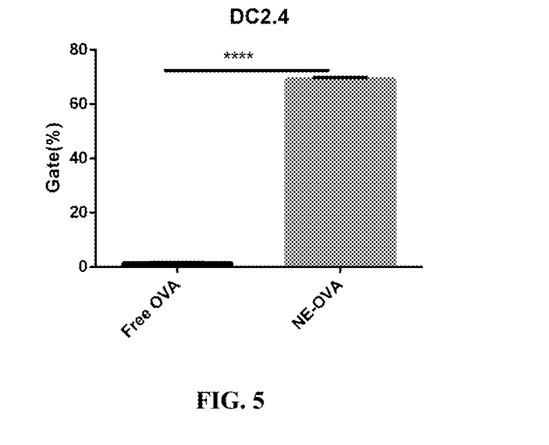
FIG. 5 shows uptake results of free FITC labeled OVA (Free OVA) and the aluminum hydroxide microemulsion (NE-OVA) entrapping the FITC labeled OVA by DC2.4 cells.

Uptake of the aluminum hydroxide microemulsion vaccine system by the DC2.4 cells: $1\times10^6$ DC2.4 cells are implanted in each well of a 12-well plate, put into an incubator for 4-6 hours, 5 μg of FITC labeled OVA or the aluminum hydroxide microemulsion entrapping the same amount of the FITC labeled OVA and prepared according to embodiment 6 are added into each well after cell anchorage. Supernatants are discarded after uptake for 1.5 hours at 37° C., cell surfaces are washed with PBS two times slightly, and then directly blown with the PBS, and the cells are centrifugally washed twice at 2000 rpm for 3 min, finally re-suspended by using 400 μl of PBS, and tested by a flow cytometer. The results are shown in FIG. 5, and the free OVA is barely taken up by the DC2.4 cells, but the uptake rate of the vaccine delivery system of the disclosure by the DC2.4 cells is about 70%, which is far higher than that of the free OVA, indicating the significant difference (****, P<0.0001); and it can be seen that the antigen is entrapped by this drug administration system, which improved the uptake efficiency of the antigen by immune cells. In the figure, the Free OVA represents free FITC labeled OVA, and NE-OVA represents the aluminum hydroxide microemulsion entrapping the FITC labeled OVA.

Embodiment 16

Figure 6:
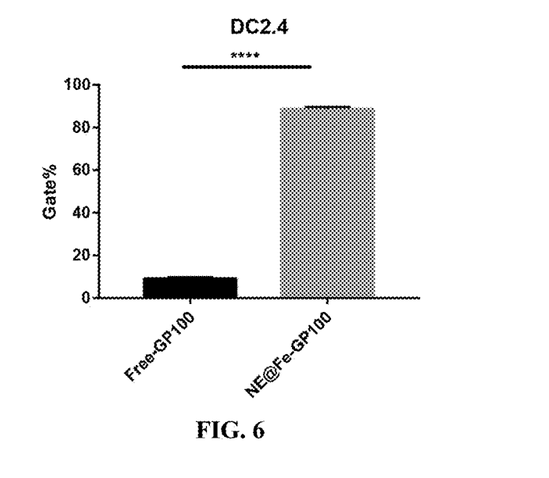
FIG. 6 shows uptake results of free FITC labeled GP100 (Free-GP100) and the ferric hydroxide microemulsion (NE@Fe-GP100) entrapping the FITC labeled GP100 by the DC2.4 cells.

Uptake of the ferric hydroxide microemulsion vaccine system by the DC2.4 cells: $1\times10^6$ DC2.4 cells are implanted in each well of a 12-well plate, and put into an incubator for 4-6 hours, and 2 μg of FITC labeled melanoma antigen peptide GP100 (ITDQVPFSV) or the ferric hydroxide microemulsion entrapping the same amount of the FITC labeled melanoma antigen peptide GP100 (ITDQVPFSV) prepared according to embodiment 9 is added into each well after cell anchorage. Supernatants are discarded after uptake for 1.5 hours at 37° C., cell surfaces are washed with PBS two times slightly, and then directly blown with the PBS, and the cells are centrifugally washed twice at 2000 rpm for 3 min, finally re-suspended by using 400 μl of PBS, and tested by a flow cytometer. The results are shown in FIG. 6, and the free melanoma antigen peptides are barely taken up by the DC2.4 cells, but the uptake rate of the vaccine delivery system of the disclosure by the DC2.4 cells is about 60%, which is far higher than that of the free polypeptides, indicating the significant difference (***, P<0.001); it can be seen that the antigen is entrapped by the microemulsion, which improved the uptake efficiency of the antigen by immune cells. In the figure, the Free-GP100 represents the free FITC labeled GP100, and NE@Fe-GP100 represents the ferric hydroxide microemulsion entrapping the FITC labeled GP100.

Embodiment 17

Figure 7:
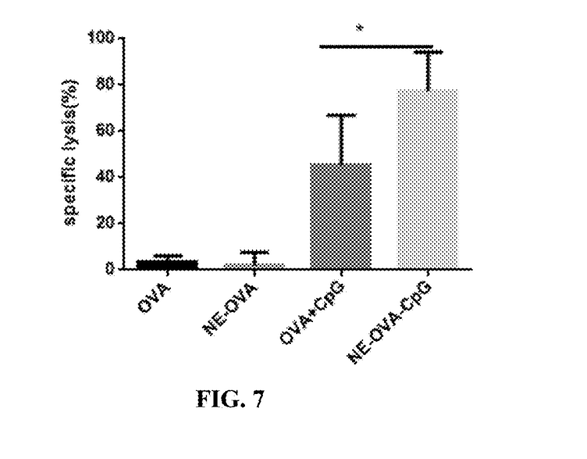
FIG. 7 shows CTL results resulting from immunization of animals by the free OVA (OVA), the aluminum hydroxide microemulsion (NE-OVA) entrapping OVA, and the free OVA and CpG (OVA+CpG)

Cytotoxic T lymphocyte (CTL) test and immune antibody testing of the aluminum hydroxide microemulsion vaccine system: 25 μl of the aluminum hydroxide microemulsion entrapping OVA and prepared in embodiment 6, the aluminum hydroxide microemulsion entrapping OVA and CpG and prepared in embodiment 7, and free OVA or free OVA and CpG (including 5 μg of OVA and 0.5 μg of CpG) are injected into paws of immunized mice on Day 0, Day 7 and Day 14, and CTL response in the body is tested by a CFSE staining method on Day 21. The results are shown in FIG. 7, and free OVA or the aluminum hydroxide microemulsion entrapping OVA cannot induce the antigen-specific cellular immune response, but the aluminum hydroxide microemulsion entrapping OVA and CpG can induce a strong antigen-specific cellular immune response, its CTL is higher than that of the free OVA+CpG group, with the significant difference (*, P<0.05). The results show that the vaccine system of the disclosure can improve a $CD8^+$ T cellular immune response, and has a wide application prospect in the fields of tumors, virus infection, etc. In the figure, OVA represents free OVA, NE-OVA represents the aluminum hydroxide microemulsion entrapping OVA, OVA+CpG represents free OVA and CpG, and NE-OVA-CpG represents the aluminum hydroxide microemulsion entrapping OVA and CpG.

Embodiment 18

Figure 8A:
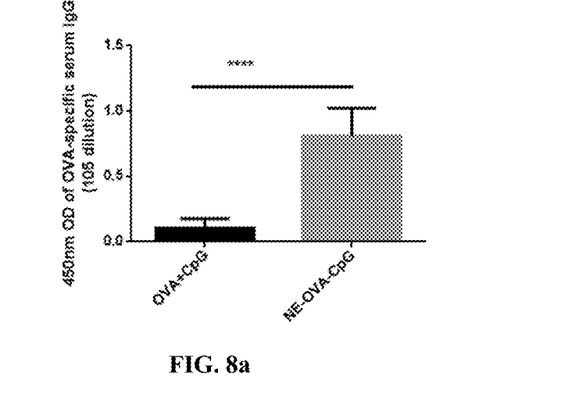
FIG. 8a to FIG. 8c show conditions of animal serum antibodies IgG (FIG. 8a), IgG1 (FIG. 8b) and IgG2a (FIG. 8c) after immunization by using the free OVA and CpG (OVA+CpG), and the aluminum hydroxide microemulsion (NE-OVA-CpG) entrapping OVA and CpG.
Figure 8B:
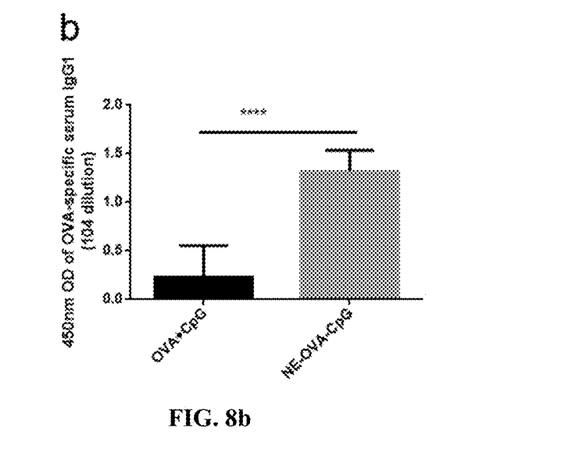
Figure 8C:
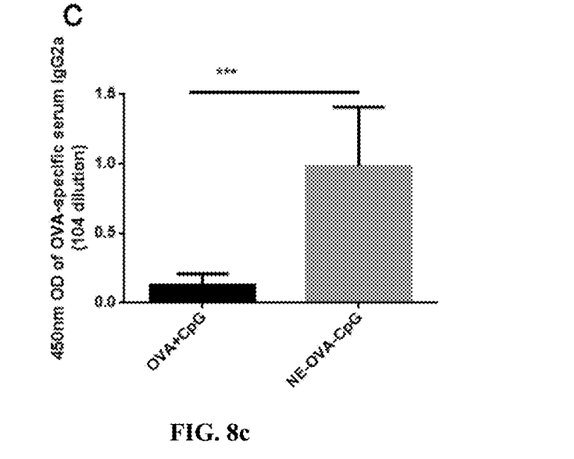

Immune antibody testing of the aluminum hydroxide microemulsion vaccine system: 25 μl of the aluminum hydroxide microemulsion entrapping OVA and CpG and prepared in embodiment 7, and free OVA and CpG (including 5 μg of OVA and 0.5 μg of CpG) are injected into paws of immunized mice on Day 0, Day 7 and Day 14, blood is taken from an eye pit on Day 21, OVA-specific antibodies in the serum are tested. The results are shown in FIG. 8a to FIG. 8c, wherein FIG. 8a, FIG. 8b and FIG. 8c show the antibody testing results of IgG, IgG1 and IgG2a, respectively; it can be known from the experimental results that the aluminum hydroxide microemulsion vaccine system can produce a strong antigen-specific immune response, and the IgG level is higher than that of the free OVA+CpG group, with the significant difference (**, P<0.0001); the IgG1 characterizing the Th2 type immune response is also obviously higher than that of the free OVA+CpG group, with the significant difference (*, namely P<0.0001); the IgG2a characterizing the Th1 type immune response is higher than that of the free OVA+CpG group, with the significant difference (***, namely P<0.001), which proves that the vaccine system of the disclosure has the advantage of obviously improving the antigen immunogenicity. In the figure, OVA+CpG represents free OVA and CpG, and NE-OVA-CpG represents the aluminum hydroxide microemulsion entrapping OVA and CpG.

The above descriptions are only the preferred embodiments of the disclosure, which are not intended to limit the disclosure in any form; the preferred embodiments of the disclosure have been disclosed as above-mentioned, which are not intended to limit the disclosure; minor alteration or modification as an equivalent embodiment of an equivalent change may be made by any person skilled in the prior art according to the technical contents disclosed above without departing from the scope of the technical solutions of the disclosure; and any simple amendment, equivalent change and modification made to the above embodiments according to the technical substance of the disclosure, without deviating from the technical solutions of the disclosure, still fall within the scope of the technical solutions of the disclosure.

The invention claimed is:

1. A microemulsion-based vaccine delivery system, wherein the microemulsion comprises an aqueous phase, an oil phase, an emulsifier, a metal ion compound, and an antigen, wherein the metal ion compound is adsorbed onto a surface of the microemulsion and entraps the antigen; a pH value of the microemulsion is from 4.0 to 10.0, and the oil phase and the emulsifier of the microemulsion contain one or more of carboxyl group, phosphoric acid, sulfonyl hydroxide, sulphate group, sulfite group, phenolic hydroxyl, enol group and boric acid group, which is capable of being partially or totally ionized to generate anions; and the metal ion compound contains metal cations, and the metal ion compound is adsorbed onto the surface of the microemulsion by a reaction with the anions on the surface of the microemulsion; and the microemulsion-based vaccine delivery system comprises the following components in parts by weight: 0.1%-5% of the oil phase, 0.01%-2% of the emulsifier, 0.001%-1% of the metal ion compound and 0.0001%-0.1% of the antigen, wherein the emulsifier is one or combinations of more than one of an anionic surfactant, a non-ionic surfactant, a cationic surfactant and a zwitterionic surfactant.

2. The microemulsion-based vaccine delivery system according to claim 1, wherein metal ions in the metal ion compound are selected from one or more of aluminum, iron, zirconium, calcium, manganese, cadmium, magnesium, cerium, cobalt, gallium or zinc, and the metal ion compound is in the form of an inorganic salt or an organic compound.

3. The microemulsion-based vaccine delivery system according to claim 1, wherein the metal ion compound is one or more of an aluminum hydroxide, a ferric hydroxide, an aluminum phosphate, a calcium phosphate and a zinc hydroxide.

4. The microemulsion-based vaccine delivery system according to claim 1, wherein the oil phase is any cosmetically or medically acceptable oil.

5. The microemulsion-based vaccine delivery system according to claim 1, wherein a particle size of the microemulsion is smaller than 1000 nm.

6. The microemulsion-based vaccine delivery system according to claim 1, wherein a particle size of the microemulsion is smaller than 300 nm.

7. The microemulsion-based vaccine delivery system according to claim 1, wherein a particle size of the microemulsion is smaller than 200 nm.

8. The microemulsion-based vaccine delivery system according to claim 1, wherein the microemulsion further contains an additive, and the additive comprises one or more of a preservative, a pH regulator, a buffer solution, an organic solvent, a chelating agent, an antioxidant, a filling agent and a colorant.

9. The microemulsion-based vaccine delivery system according to claim 1, wherein the antigen is one or combinations of more than one of a protein, a polypeptide, a nucleic acid, an oligosaccharide, a polysaccharide, a tumor cell lysate, a tumor cell membrane vesicle antigen, a bacterial lysate, a bacterial cell membrane, a *mycoplasma* cell membrane, a *chlamydia* cell wall, a spirochete, a *rickettsia* microcapsule, a viral envelope, an exosome, a virus lysate antigen and a bacterial outer membrane vesicle antigen.

10. A preparation method for the microemulsion-based vaccine delivery system according to claim 1, comprising the following steps:
(1) dissolving lipophilic emulsifier into the oil phase, dissolving hydrophilic emulsifier into the aqueous phase, and fully mixing them to obtain a microemulsion;
(2) adding a pH buffer solution and/or an anion portion of the metal ion compound into the above microemulsion;
(3) adding a cation portion of the metal ion compound into a mixture obtained in the step (2);
(4) adding the antigen into the mixture obtained in step (2) or step (3), and evenly mixing the mixture to obtain a vaccine.

11. The preparation method for the microemulsion-based vaccine delivery system according to claim 1, comprising the following steps:
(1) dissolving lipophilic emulsifier into the oil phase, dissolving hydrophilic emulsifier into the aqueous phase, and fully mixing to obtain a microemulsion;
(2) adding the cation portion of the metal ion compound into the above microemulsion;
(3) adding the pH buffer solution and/or the anion portion of the metal ion compound into the mixture obtained in step (2);
(4) adding the antigen into the mixture obtained in step (2) or step (3), and evenly mixing the mixture to obtain the vaccine.

12. The microemulsion-based vaccine delivery system according to claim 1 in preparation of preventive and/or therapeutic immune drugs.

13. An application of the vaccine delivery system prepared by the preparation method according to claim 10 in preparation of preventive and/or therapeutic immune drugs.

* * * * *